United States Patent
Rippe et al.

(10) Patent No.: US 9,883,208 B2
(45) Date of Patent: Jan. 30, 2018

(54) DATA SYNCHRONIZATION FOR CONTENT ON DEMAND ASSET INSERTION DECISIONS

(71) Applicant: Canoe Ventures, Lakewood, CO (US)

(72) Inventors: Christopher M Rippe, Lafayette, CO (US); Jonathan E. Farb, New York, NY (US); Thomas M. Moretto, Denver, CO (US); Timothy R Whitton, Parker, CO (US)

(73) Assignee: Canoe Ventures LLC, Lakewood, CO (US)

( * ) Notice: Subject to any disclaimer, the term of this patent is extended or adjusted under 35 U.S.C. 154(b) by 0 days.

(21) Appl. No.: 13/628,447

(22) Filed: Sep. 27, 2012

(65) Prior Publication Data

US 2014/0089997 A1    Mar. 27, 2014

(51) Int. Cl.

| | |
|---|---|
| *H04N 7/173* | (2011.01) |
| *H04N 21/20* | (2011.01) |
| *H04N 21/222* | (2011.01) |
| *H04N 21/2225* | (2011.01) |
| *H04N 21/234* | (2011.01) |
| *H04N 21/472* | (2011.01) |
| *H04N 21/81* | (2011.01) |

(52) U.S. Cl.
CPC ......... *H04N 21/20* (2013.01); *H04N 21/2221* (2013.01); *H04N 21/2225* (2013.01); *H04N 21/23424* (2013.01); *H04N 21/47202* (2013.01); *H04N 21/812* (2013.01)

(58) Field of Classification Search
CPC ............... H04N 21/20; H04N 21/2221; H04N 21/2225; H04N 21/23424; H04N 21/47202; H04N 21/812
See application file for complete search history.

(56) References Cited

U.S. PATENT DOCUMENTS

| | | |
|---|---|---|
| 6,215,534 B1 | 4/2001 | Raj et al. |
| 6,563,536 B1 | 5/2003 | Rashkovskiy et al. |
| 6,616,533 B1 | 9/2003 | Rashkovskiy |
| 6,912,504 B1 | 6/2005 | Rashkovskiy |
| 7,082,254 B1 | 7/2006 | Rashkovskiy et al. |
| 7,162,700 B1 | 1/2007 | Rashkovskiy |
| 7,263,714 B2 | 8/2007 | Lowthert et al. |
| 7,337,463 B1 | 2/2008 | Rosenberg et al. |

(Continued)

*Primary Examiner* — Oschta Montoya
(74) *Attorney, Agent, or Firm* — Duft Borsen & Fettig LLP; Gregory T. Fettig

(57) ABSTRACT

Systems and methods presented herein provide for maintaining data pertaining to asset insertions into COD content. In one embodiment, a system includes a database that maintains campaign data of a plurality of assets, and a processor that monitors insertions of at least a portion of the assets in a first COD content to record campaign data of the inserted assets. A storage module stores the recorded campaign data of the inserted assets in a list. The processor is also operable to detect a request for asset insertions in a second COD content, to determine that the database of campaign data is unavailable for the asset insertion request of the second COD content, to retrieve the list of campaign data from the storage module, and, in response to determining the unavailability of the database, to direct asset insertions in the second COD content based on the list of campaign data.

9 Claims, 8 Drawing Sheets

(56) References Cited

U.S. PATENT DOCUMENTS

| | | |
|---|---|---|
| 7,383,563 B1 | 6/2008 | Rashkovskiy |
| 7,519,273 B2 | 4/2009 | Lowthert |
| 7,882,045 B1 | 2/2011 | Cole et al. |
| 8,214,256 B2 | 7/2012 | Riedl et al. |
| 8,813,124 B2 | 8/2014 | Tidwell et al. |
| 2001/0039550 A1* | 11/2001 | Putzolu ............ 707/205 |
| 2001/0056465 A1 | 12/2001 | Aiso |
| 2002/0059094 A1 | 5/2002 | Hosea et al. |
| 2002/0095675 A1 | 7/2002 | Lowthert et al. |
| 2002/0100043 A1 | 7/2002 | Lowthert et al. |
| 2002/0100062 A1 | 7/2002 | Lowthert et al. |
| 2002/0126751 A1 | 9/2002 | Scheurich et al. |
| 2002/0144262 A1 | 10/2002 | Plotnick et al. |
| 2003/0023973 A1 | 1/2003 | Monson et al. |
| 2003/0055729 A1 | 3/2003 | Bezos et al. |
| 2003/0149975 A1 | 8/2003 | Eldering et al. |
| 2003/0177490 A1 | 9/2003 | Hoshino et al. |
| 2003/0188308 A1 | 10/2003 | Kizuka |
| 2004/0189873 A1 | 9/2004 | Konig et al. |
| 2004/0194130 A1 | 9/2004 | Konig et al. |
| 2004/0216170 A1 | 10/2004 | Rashkovskiy |
| 2004/0237102 A1 | 11/2004 | Konig et al. |
| 2005/0060742 A1 | 3/2005 | Riedl et al. |
| 2007/0088801 A1* | 4/2007 | Levkovitz et al. ........... 709/217 |
| 2007/0162951 A1 | 7/2007 | Rashkovskiy |
| 2008/0046924 A1 | 2/2008 | Hood |
| 2008/0127257 A1* | 5/2008 | Kvache ............ 725/39 |
| 2009/0171784 A1 | 7/2009 | Morgan et al. |
| 2009/0187939 A1 | 7/2009 | LaJoie |
| 2009/0204615 A1 | 8/2009 | Samame et al. |
| 2009/0304357 A1 | 12/2009 | Rashkovskiy et al. |
| 2009/0304358 A1 | 12/2009 | Rashkovskiy et al. |
| 2010/0030744 A1 | 2/2010 | DeShan et al. |
| 2010/0131969 A1 | 5/2010 | Tidwell et al. |
| 2010/0138290 A1 | 6/2010 | Zschocke et al. |
| 2010/0153993 A1 | 6/2010 | Konig et al. |
| 2010/0158098 A1 | 6/2010 | McSchooler et al. |
| 2010/0228591 A1 | 9/2010 | Therani et al. |
| 2010/0251289 A1 | 9/2010 | Agarwal et al. |
| 2010/0251305 A1 | 9/2010 | Kimble et al. |
| 2011/0015975 A1 | 1/2011 | Yruski et al. |
| 2011/0016479 A1 | 1/2011 | Tidwell et al. |
| 2011/0016482 A1 | 1/2011 | Tidwell et al. |
| 2011/0191802 A1 | 8/2011 | Haberman et al. |
| 2011/0295700 A1 | 12/2011 | Gilbane et al. |
| 2012/0023522 A1 | 1/2012 | Anderson et al. |
| 2012/0284747 A1 | 11/2012 | Joao |
| 2013/0042285 A1 | 2/2013 | Downey et al. |
| 2013/0078916 A1 | 3/2013 | Glickman |
| 2013/0097027 A1 | 4/2013 | Wang et al. |
| 2013/0110947 A1 | 5/2013 | Boukadakis et al. |
| 2014/0020017 A1 | 1/2014 | Stern et al. |
| 2014/0101685 A1 | 4/2014 | Kitts et al. |
| 2014/0366051 A1 | 12/2014 | Cronk et al. |

* cited by examiner

DATA SYNCHRONIZATION FOR CONTENT ON DEMAND ASSET INSERTION DECISIONS

CROSS REFERENCE TO RELATED APPLICATIONS

This patent application is related to commonly owned and co-pending patent application Ser. Nos. 13/628,324 13/628,360, 13/628,381, and 13/628,469; hereafter the "related patent applications, the contents of each of which are incorporated by reference.

FIELD OF THE INVENTION

The invention relates to the field of Content On Demand (COD) systems and more specifically to the insertion of assets, such as advertisements, into COD content and to the synchronization of data relating to asset insertion.

BACKGROUND

Television networks, such as the American Broadcasting Company (ABC), the Columbia Broadcasting Company (CBS), and the National Broadcasting Company (NBC), have for years broadcast television shows to the masses as a means for generating revenue through advertising. For example, these networks produce television shows and then seek out sponsors to advertise on the shows. The television shows, or "content", have designated timeslots in which the sponsors' advertisements, or "assets", are inserted. The content and the inserted assets are then broadcast by the television networks, or "content providers", to the public over federally licensed communication airways, occasionally referred to as linear video distribution.

This "shotgun" approach to advertising proved to be very successful in the beginning. However, as the number of advertisers wishing to sell their goods and services substantially increased, television evolved into a much more complex system of communications. For example, cable television providers and satellite television providers now serve as an intermediary between the content providers and the intended public audience. And, the number of content providers has increased accordingly. In this regard, many members of the general public have signed on as customers of the cable/satellite television providers so as to receive a broader availability of content.

Because the market for content consumption has grown, the number of television providers has also grown. And, because each of these providers has its own method of content delivery, the manner in which the content and assets are delivered to the customers has become increasingly complex. Generally, the content providers deliver the content to the television providers with instructions to insert various national assets into the content at certain times. For example, if a company wishes to run a national advertisement campaign targeting a certain television show associated with a particular demographic, the company may purchase one or more timeslots, or "placement opportunities", within that television show from the content provider to air assets advertising the goods and services of the company. The content provider then provides the content to each of the television providers with directions to insert the assets within the timeslots purchased by the company.

The television providers may also have certain timeslots available for inserting certain local assets. For example, a television provider may have "headends" configured in various communities to distribute content to their customers located therein. Each headend receives content from the content providers with various designated timeslots for inserting assets into the content. Some of those timeslots may be designated for local ads where companies within the service area of the headend wish to advertise. These companies purchase those timeslots from the television provider for insertion of their assets to expose the customers to their advertising at the more local level.

As complex as the cable/satellite television has become, certain devices have come along to change and/or circumvent these forms of marketing altogether. The digital recorder, such as that produced by Tivo, is one example of a means for avoiding the asset insertions of marketing strategists. With the digital recorder, the television providers' customers are able to digitally record entire episodes of content and view that content at their leisure, as opposed to a time established by the content providers. However, these customers could also use the digital recorders to fast-forward or skip through the assets without viewing them, much to the dismay of the asset owners/marketers.

In response, television providers started providing content on a "Content On Demand" (COD) basis, occasionally referred to as nonlinear video distribution. In COD, the content provider delivers the content to the television provider which in turn maintains the content for subsequent and individual distribution to their customers. Thus, a customer may select a desired content through a set-top box (STB) or other device and watch that content at the customer's leisure. This COD content is also typically configured with timeslots where assets may be inserted. However, marketing strategists have not been able to determine the effectiveness of asset insertion in COD content.

SUMMARY

Systems and methods presented herein provide for maintaining data pertaining to asset insertions into COD content. In one embodiment, a system is operable to maintain data associated with asset insertions in COD content. The system includes a database operable to maintain campaign data of a plurality of assets, and a processor operable to monitor insertions of at least a portion of the assets in a first COD content to record campaign data of the inserted assets. The system also includes a storage module operable to store the recorded campaign data of the inserted assets in a list. The processor is further operable to detect a request for asset insertions in a second COD content, to determine that the database of campaign data is unavailable for the asset insertion request of the second COD content, to retrieve the list of campaign data from the storage module, and, in response to determining the unavailability of the database, to direct asset insertions in the second COD content based on the list of campaign data.

The processor may also be operable to establish a recording period for asset insertions, to record campaign data of assets inserted in a plurality of COD content selections during the recording period, to determine that the database after the recording period is unavailable, and to direct subsequent asset insertions based on the campaign data recorded during the recording period. For example, the processor may take snapshots of the asset insertions for use in synchronizing the database once it becomes available. During its unavailability, however, the processor may provide a snapshot to a COD asset insertion decision system such that the COD asset insertion decision system may direct asset insertions based on the campaign data therein.

The processor may also be operable to trigger the unavailability of the database by disabling access to the database to direct the asset insertions in the second COD content based on the list of campaign data to reduce a number of accesses to the database. For example, campaign data computations based on numerous asset insertion requests can be quite processor intensive. Accordingly, the processor may take snapshots of the asset insertions so as to alleviate the number of campaign data computations and/or the number of accesses to the database. Afterwards, the processor may synchronize the database with the recorded asset insertions. Alternatively or additionally, the processor may be operable to monitor the database to detect an outage of the database to determine the unavailability of the database and then synchronize the database with the recorded asset insertions once it becomes available.

The various embodiments disclosed herein may be implemented in a variety of ways as a matter of design choice. For example, the embodiments may take the form of physical machines, computer hardware, software, firmware, or combinations thereof. In another embodiment, a computer readable medium is operable to store software instructions for maintaining data of directed asset insertions in a database and synchronizing the database at various times. These software instructions are configured so as to direct a processor or some other processing system to operate in the manner described above.

Additionally, although the term "headend" generally suggests the distribution center or office of a cable television operator or MSO, the term is not intended to be so limited. The term headend as used herein is any system operable to deliver content to a viewer (e.g., a customer or user of the CPE). For example, the term headend may encompass internet servers delivering COD content when selected by a user from a device, such as a computer, a tablet, or a mobile phone. A headend may also refer to a telecom provider that distributes content to mobile phones and other devices. Also, the term "asset", as used herein, includes any type of media for which an owner desires promotion. Examples of such include traditional television commercials, advertisements, streaming video commercials, promotional materials, marketing information, and the like. The term "content", as used herein is any type of media, such as audio and/or video, in which assets may be inserted. For example, the content operable within the COD delivery systems described herein may be streamed Internet audio/video, analog cable television feeds, digital cable television feeds, digital satellite television feeds, or digital satellite radio feeds. Thus, the content of the COD described herein is intended to encompass Video on Demand (VOD) found in modern cable television as well as pay-per-view (PPV) delivered by both modern cable television and satellite television.

Other exemplary embodiments are described below.

BRIEF DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below.

Figure 1:
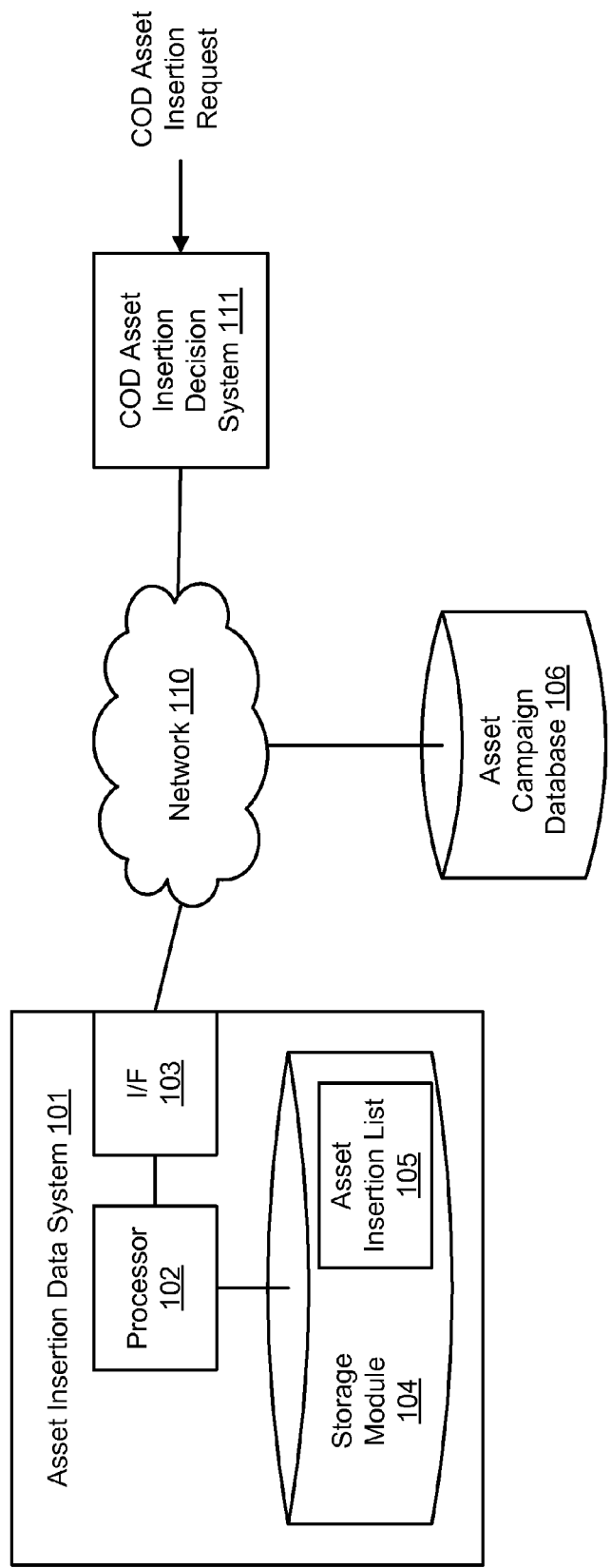
FIG. 1 is a block diagram of an exemplary asset insertion data system operable with a COD asset insertion decision system.

FIG. 1 is a block diagram of an exemplary asset insertion data system 101 operable with a COD asset insertion decision system 111. The asset insertion data system 101 is any system device, software, or combination thereof operable to maintain campaign data for the COD asset insertion decision system 111 and an asset campaign database 106. The COD asset data system 101 includes an interface 103 operable to communicate with the COD asset insertion decision system 111 and the asset campaign database 106. The asset insertion data system 101 also includes a processor 102 operable to process data relating to the insertions of assets into COD content selections as directed by the COD asset insertion decision system 111 (e.g., campaign data). The processed data is stored in the asset insertion list 105 of the storage module 104. Thus, processor 102 is any system, device, software, or combination thereof operable to process the asset data and the storage module 104 is any system, device, software, or combination thereof operable to store and maintain that data.

The COD asset insertion decision system 111 is any system, device, software, or combination thereof operable to receive asset insertion requests to select assets and direct their insertion into selected COD content. The asset campaign database 106 is any system, device, software, or combination thereof operable to monitor the campaigns of the assets as influenced by the assets being inserted in the selected COD content. For example, the COD asset insertion decision system 111 may access the asset campaign database 106 to determine a health of campaigns (e.g., a percentage of assets inserted based on the number of required assets in the campaign). The COD asset insertion decision system 111 may use that campaign data to compute, among other things, rankings of the assets that provide value to a provider of the selected COD content (e.g., a cable television headend). Afterwards, the COD asset insertion decision system 111 may direct one or more of the ranked assets for insertion into the selected COD content.

The asset campaign database 106 may monitor the actual insertions of the assets within each of the various COD content selections (e.g., by monitoring the actual COD system 203 shown below and/or the COD asset insertion decision system 111). The asset campaign database 106 may then log the actual insertions of the assets to compute/ maintain the data relating to the campaign health of the assets. For example, if an asset campaign dictates that a particular asset is to be inserted into COD content 100 times within a day, and monitoring has shown that the asset has been inserted into various COD content selections 60 times during that day, the asset campaign database 106 may show that the campaign is 60% complete and still eligible for COD content insertions. Each time that asset is inserted into a COD content selection, the asset campaign database 106 may recompute the campaign data associated with the asset to ensure that the asset is not further placed after meeting the campaign requirements. Examples of campaigns, campaign items, assets, and their associated data and computations are shown and described in the related patent applications.

In some instances, this computation of campaign data can be quite time-consuming and processor intensive. For example, when the COD asset insertion decision system 111 is operable to direct insertion of assets into thousands or even hundreds of thousands of COD content selections at any given time, the link between the COD asset insertion decision system 111 and the asset campaign database 106 may be overwhelmed with data requests. And, since each time an asset is inserted into a particular COD content selection, the campaign data is typically recalculated which substantially increases the amount of processing being performed by so many requests.

To decrease the amount of processing related to so many COD content insertion requests, the asset insertion data system 101 provides a means for caching data of the insertions directed by the COD asset insertion decision system 111 in the asset insertion list 105 within the storage module 104. This caching means alleviates the accesses to the asset campaign database 106 by the COD asset insertion decision system 111 and provides periodic synchronization of the database 106. The caching means may also provide backup in the instance of an outage. Additional details of the asset insertion data system 101 are shown and described below.

The network 110 may be any type of communication link capable of providing communication between the COD asset insertion decision system 111, the asset campaign database 106, and the asset insertion data system 101. For example, the network 110 may be the Internet, an Intranet, or some other type of data network. Alternatively, the network 110 may be an analog network operable to communicate content, such as analog television networks and analog radio networks. The network 110 may also be implemented as a virtual private network via the Internet.

The asset insertion data system 101 may be separate from the COD asset insertion decision system 111 to provide data synchronization to the asset insertion decision system 101. Alternatively, the asset insertion data system 101 may be co-located with the COD asset insertion decision system 111. The asset insertion data system 101 may also be communicatively coupled to the COD asset insertion decision system 111 by other means (e.g., direct link using various communication standards). The COD asset insertion decision system 111 may also communicate through the network 110 with a headend (shown and described below) using standard cable television protocols such as the Society of Cable Telecommunications Engineers (SCTE) standards and/or the Entertainment Identifier Registry (EIDR). Also, although shown and described with respect to the asset campaign database 106 being linked with the asset insertion data system 101, the invention is not intended to be so limited. In some embodiments, the asset campaign database 106 is configured with the asset insertion data system 101.

Figure 5:
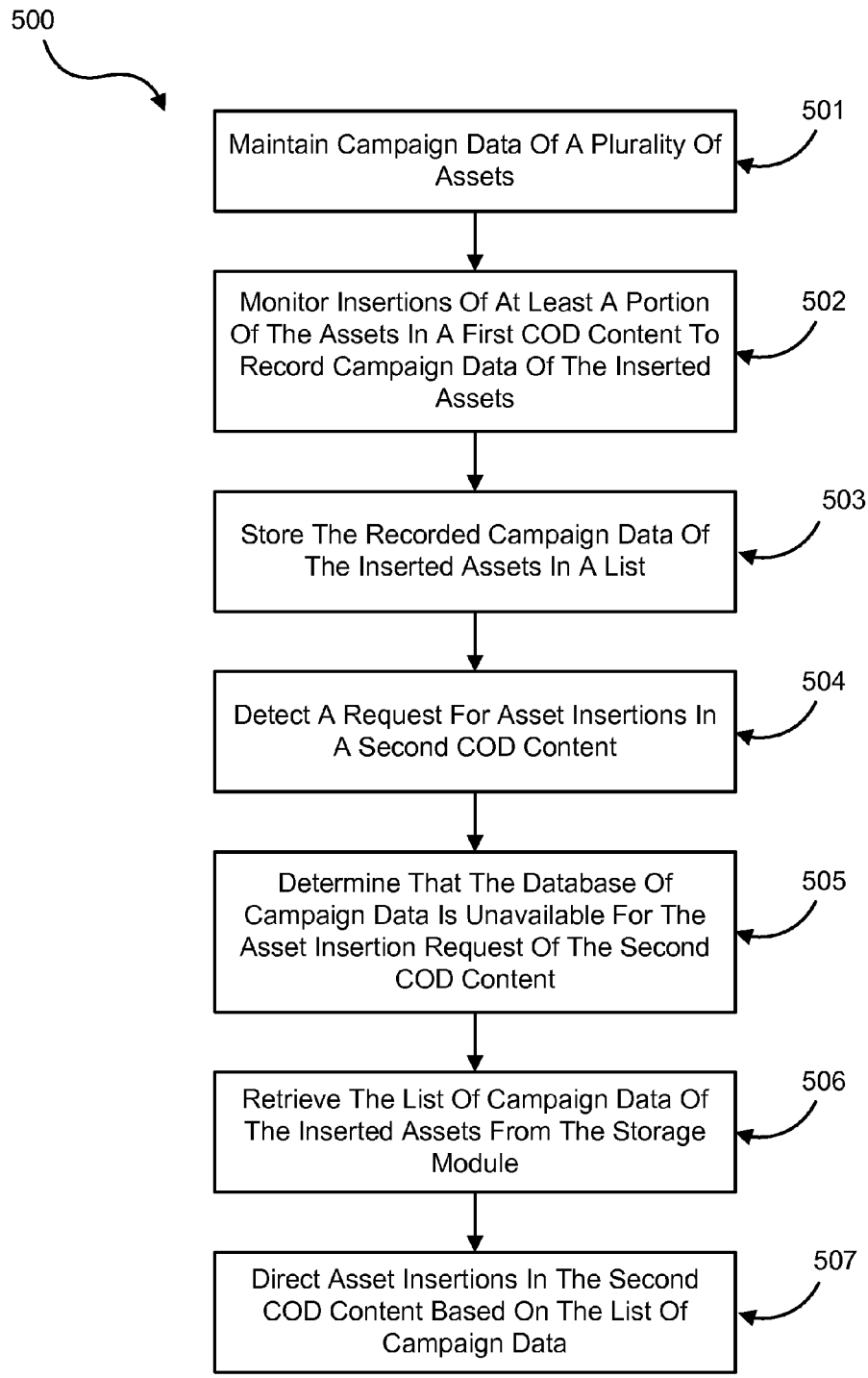
FIG. 5 is a flowchart of an exemplary method operable with the asset insertion data system.

An exemplary process relating to the operation of the COD asset insertion data system 101 is shown and described in the flowchart of FIG. 5. However, before delving into specific aspects of the COD asset data system 101, a discussion of the COD asset insertion decision system 111 is first presented.

Figure 2:
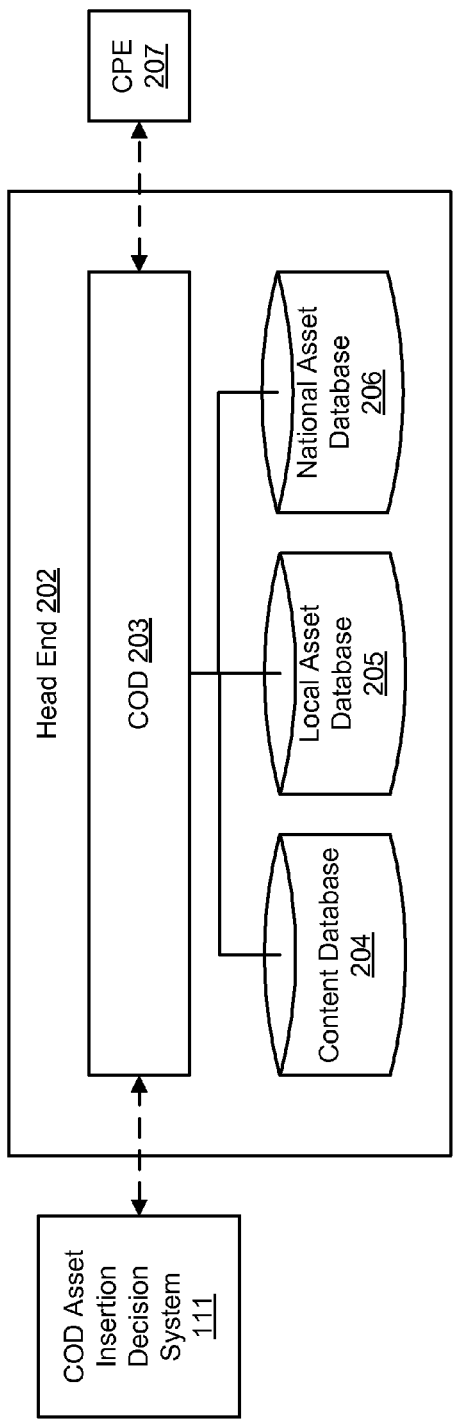
FIG. 2 is a block diagram of an exemplary COD asset insertion decision system operable with a COD system of a headend.

In FIG. 2, a block diagram of an exemplary COD asset insertion decision system 111 operable with a COD system 203 (also known as a "COD back office system") of a headend 202 is illustrated. The headend 202 is generally any system operable to receive content for processing and distribution to a CPE 207 (e.g., over a cable television infrastructure or from satellite). For example, the headend 202 may receive content from content providers over television signals for distribution to the customers of a cable television provider via the customer premise equipment (CPE) 207, such as a set-top box (STB), a gaming console, a smart phone, an electronic tablet, a computer, or the like.

To provide the COD content, the headend 202 includes a COD system 203 that is operable to provide content to the CPE 207 when desired by the customer. For example, the headend 202 may receive the content from the content providers and maintain that content within a content database 204. The headend 202 may also maintain local assets in a local asset database 205 and national assets in a national asset database 206. When a particular content is selected by the user of the CPE 207, the COD 203 accesses the content database 204 to retrieve the selected content and deliver that content to the CPE 207. In this regard, the COD 203 is any system or device that is operable to deliver video content to the CPE 207 when directed by the CPE 207. The COD asset insertion decision system 111 is any system or device that is operable to direct insertion of assets into the content provided to the CPE 207 by the COD 203. The databases 204, 205, and 206 are any systems or devices operable to store and maintain data, audio, and/or video for subsequent distribution to the CPE 207. For example, the databases 204, 205, and 206 may be operable within a computer system that stores the video and audio (e.g., MPEG) content and assets such that they may be accessed by the COD 203 and delivered to the CPE 207 when desired by the user of such.

Figure 3:
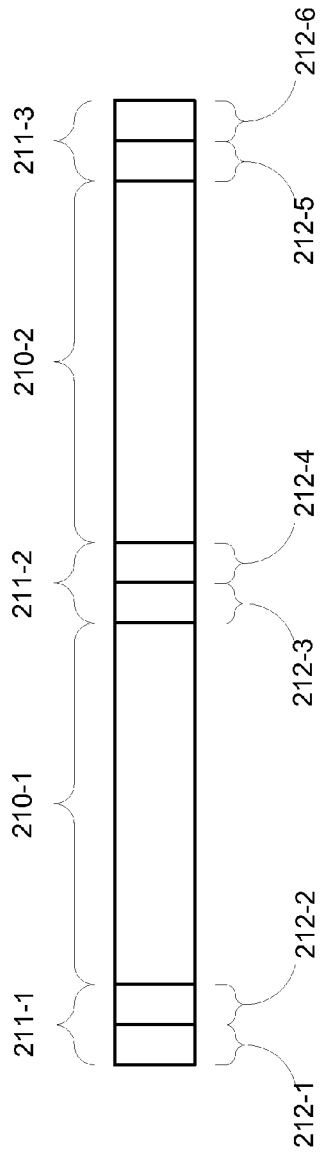
FIG. 3 is an exemplary timing diagram of content interlaced with asset timeslots.

To illustrate the insertion of assets into content, FIG. 3 shows an exemplary timing diagram of content 210 interlaced with asset timeslots 211, also known as "break positions". When the COD 203 receives a message from the CPE 207 for the content 210, the COD 203 retrieves the content 210 from the content database 204. The content 210, in this embodiment, is divided into two segments 210-1 and 210-2 with timeslots 211 disposed at the front end of the content 210-1 (i.e., timeslot 211-1 at the pre roll position), in between the content segments 210-1 and 210-2 (i.e., timeslot 211-2 at the mid roll position), and at the end of the content segment 210-2 (i.e., timeslot 211-3 at the post roll position). Each timeslot 211 is divided into two asset placement timeslots 212, or "placement opportunities", each of which being capable for accepting an asset that is typically, but not always, 30 seconds in duration. Thus, a placement opportunity is generally a subset of time of a particular timeslot 211. The COD asset insertion decision system 111 directs the COD 203 to insert the assets according to a particular ranking that provides value for an MSO and/or a content provider (e.g., monetary value, enhanced relationships with asset providers, etc.). In this regard, the COD asset insertion decision system 111 may direct the COD 203 to select assets from the national asset database 206 and/or the local asset database 205 for insertion into the asset timeslots 212-1-212-6 based on the ranking provided by the COD asset insertion decision system 111.

The invention is not intended to be limited to the COD asset insertion decision system 111 merely providing direction to the COD 203 for selection of various assets in a local asset database 205 and the national asset database 206. In one particular embodiment, the COD asset insertion decision system 111 is communicatively coupled to a content provider so as to receive instructions regarding various campaigns from asset providers on a national level. Alternatively or additionally, the COD asset insertion decision system 111 is communicatively coupled to asset providers to receive and direct insertion of the assets therefrom into the content 210. In some embodiments, such as those illustrated below, the COD asset insertion decision system 111 may be configured with the headend 202 to direct insertion of assets into the asset timeslots 212-1-212-6.

Also, the invention is not intended be limited to any particular number of content segments 210 or any particular number of asset timeslots. In fact, an asset timeslot 212 may be subdivided for insertion of multiple assets. For example, television commercials are typically 30 seconds in length. Occasionally, however, asset providers reduce the material of certain assets to reduce the overall duration of a particular asset (e.g., by removing material from a 30 second commercial to reduce it to a 15 second commercial). Accordingly, a 30 second asset timeslot 212 may be configured to accept insertions of two 15 second assets. Embodiments described herein are not intended to be limited to any particular asset duration, asset timeslot 212 duration, or timeslot 211 duration as such may be configured to meet certain business and/or technical needs.

It should be noted that the decisions regarding the direction of asset insertions occur quite rapidly. For example, the COD asset insertion decision system 111 may be operable to make asset insertion decisions for a plurality of headends 202. And, each headend 202 may be operable to provide COD content to a plurality of CPEs 207 at any given time, possibly thousands or more. Thus, when a COD content selection is made by a particular CPE 207, the COD asset insertion decision system 111 responds in substantially real time to ensure that the COD 203 has ample time to retrieve and insert the assets while processing the content selected by the CPE 207.

Figure 4:
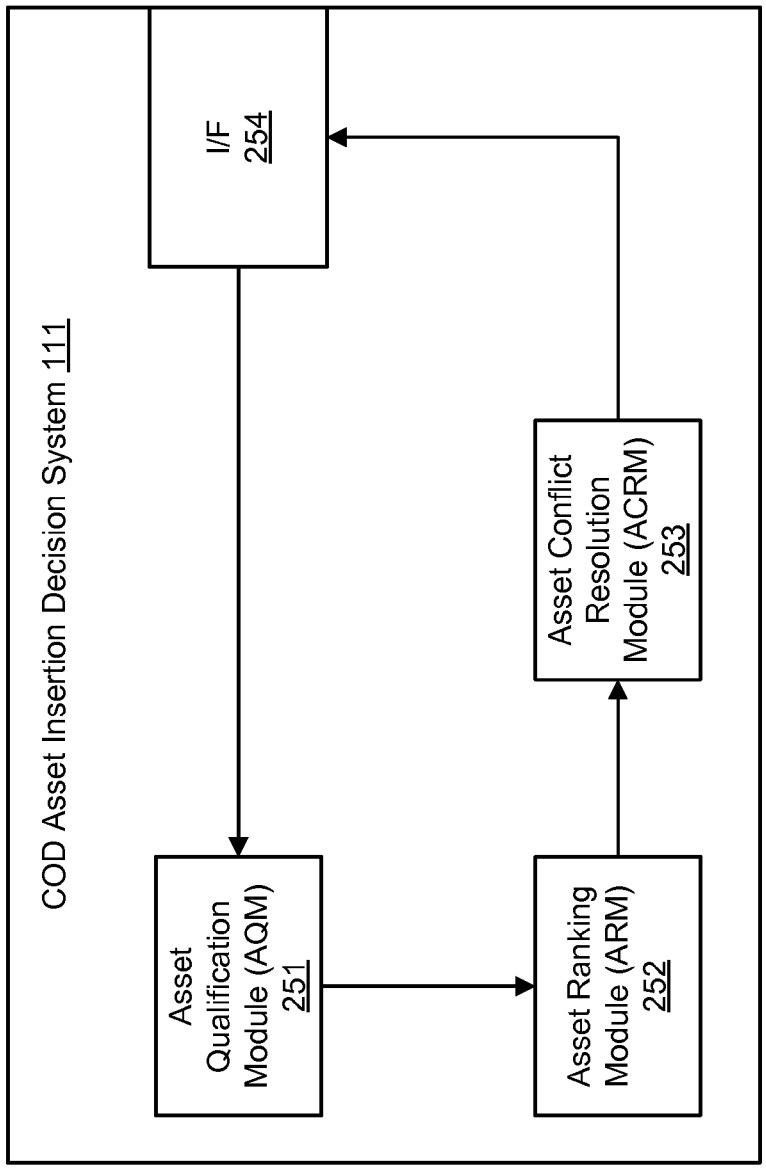
FIG. 4 is block diagram of an exemplary COD asset insertion decision system.

FIG. 4 is a more detailed block diagram of an exemplary COD asset insertion decision system 111. In this embodiment, the COD asset insertion decision system 111 includes an interface 254, an asset qualification module (AQM) 251, an asset ranking module (ARM) 252, and an asset conflict resolution module (ACRM) 253. The interface 254 is any device or system operable to receive information pertaining to a content selection by a CPE 207 such that the COD asset insertion decision system 111 may direct asset insertion into the selected content. In this regard, the interface 254 may also be operable to transfer information to the COD 203 to direct the COD 203 to insert certain assets from the national asset database 206 and/or the local asset database 205.

The AQM 251 is any device or system operable to communicate with the interface 254 to initially qualify assets for insertion within the content. The AQM 251 may exclude certain assets from insertion into the content selected by the CPE 207. The ARM 252 is any device or system operable to rank the remaining assets (i.e., those not already excluded by the AQM 251) for insertion to the content 210. The ACRM 253 is any device or system operable to remove any ranked assets from insertion into the content 210 based on conflicts between assets. For example, the ACRM 253 may determine that assets from certain advertisers conflict with one another (e.g., Coke and Pepsi). Accordingly, the ACRM 253 may be operable to prevent assets from these advertisers from being inserted within a same timeslot 211 or even within a same content 210.

Initiation of the COD asset insertion begins when a CPE 207 selects a particular content provided by the headend 202. The CPE 207 transfers a content request to the COD 203 which in turn retrieves the content from the content database 204. The COD 203 may also retrieve active campaigns from the national asset database 206 and/or the local asset database 205. For example, each asset provider may generate an advertising campaign with one or more campaign items. Each of these campaign items may be associated with one or more assets of the asset provider designating the desired time, date, content, audience/demographic, etc., for which the assets are to be inserted into selected COD content. The COD 203 may retrieve the active campaigns of the asset providers and generate an asset insertion request for the AQM 251 of the COD asset insertion decision system 111.

Upon receiving the request, the AQM 251 may determine certain parameters relating to the placement of the assets. For example, the AQM 251 may determine durations of the assets and various placement opportunities for the assets (i.e., appropriate timeslots within the selected content). The AQM 251 may also process the active campaigns to determine their eligibility within the content to generate a list for the ARM 252 such that the ARM 252 may rank and select eligible campaigns from that list. In doing so, the AQM 251 may exclude certain campaigns from the list based on various criteria, such as whether the asset provider and/or the asset itself is valid and whether the insertion opportunities themselves are valid.

Once the ARM 252 receives the eligible campaign list, the ARM 252 ranks the campaigns and their various assets for insertion into the content selected by the CPE 207. The ARM 252 may rank the campaigns based on, among other things, their value to the content provider and/or the television provider, the strategy of the campaign, and the priority of the campaign. The ranked list of eligible campaigns is then generated and transferred to the ACRM 253 which determines whether any conflicts exist among the ranked campaigns. The ACRM 253 excludes certain campaigns from insertion when they conflict with others in the content selected by the CPE 207. For example, when one campaign conflicts with another campaign in the list for a particular selected content, the asset of the higher ranked campaign may be inserted into the content effectively excluding the lower-ranked campaign from that content.

Once the ACRM 253 removes conflicts from the ranked list of possible campaigns, the ACRM 253 transfers the final placement of the assets within the content to the COD 203, which in turn inserts the assets into the timeslots of the selected content. The COD 203 retrieves the assets from the local asset database 205 and/or the national asset database 206 for insertion of the assets into the selected content. With the assets inserted into the selected content, the COD 203 transfers the content and assets to the CPE 207 for presentation to the user thereof.

After the content is delivered to the CPE 207 with the inserted assets, the COD asset insertion decision system 111 reports the insertion (e.g., to the headend 202, the content providers, and/or the asset providers) such that the asset campaign database 106 can recompute and/or synchronize campaigns for another/subsequent content selection by a CPE 207. Examples of the various components and operations of the COD asset insertion decision system 111 are shown and described in the related patent applications.

Returning now to the asset insertion data system 101, an exemplary method operable with the asset insertion data system 101 is illustrated in the flowchart 500 of FIG. 5. Operation of the asset insertion data system 101 first occurs with the asset campaign database 106 maintaining campaign data of a plurality of assets, in the process element 501. As mentioned above, the asset campaign database 106 monitors the insertions of assets into COD content selections as directed by the COD asset insertion decision system 111. With each asset insertion, the asset campaign database 106 updates the campaign data such that it may be provided to the COD asset insertion decision system 111 upon a subsequent COD asset insertion request.

To reduce the number of accesses to the asset campaign database 106 with the subsequent COD asset insertion requests, the asset insertion data system 101 (e.g., via the processor 102) monitors insertions of at least a portion of the assets in a first COD content to record campaign data of the inserted assets, in the process element 502. The asset insertion data system 101 then stores the recorded campaign data of the inserted assets in the list 105 (e.g., via the storage module 104), in the process element 503. The asset insertion data system 101 detects a request for asset insertions in a second COD content, in the process element 504, and then determines the unavailability of the campaign data of the database 106 for the second asset insertion request, in the process element 505. For example, the asset insertion data system 101 may turn off access to the asset campaign database 106. Accordingly, the COD asset insertion decision system 111 is prevented from gaining access to updated campaign data for computations regarding the decisions for inserting assets into subsequent COD content selections (e.g., the second COD content selection). Alternatively, an outage may occur with the asset campaign database 106 which naturally precludes access to up-to-date campaign data by the COD asset insertion decision system 111. In either case, the asset insertion data system 101 retrieves the list 105 of campaign data of the inserted assets of the first COD content selection from the storage module 104, in the process element 506. This cached list 105 is then provided to the COD asset insertion decision system 111 to direct subsequent assets insertions in the second COD content based on the campaign data therein, in the process element 507.

Although shown and described with respect to first and second COD content selections, the invention is not intended to be limited to such a discussion. Rather, the first and second COD content selections are merely intended to illustrate the nature in which the asset campaign database 106 is no longer available such that the asset insertion data system 101 may provide the asset insertion list 105 to the COD asset insertion decision system 111 during outages, be it due to the intentional disabling of the asset campaign database 106 by the asset insertion data system 101 or due to the unintentional outage of the asset campaign database 106. In this regard, the processor 102 may be further operable to establish a recording period for asset insertions to record campaign data of assets inserted in a plurality of COD content selections during the recording period. For example, the processor 102 may be operable to take a "snapshot" of the asset insertions during a certain period of time. After that period of time, the processor 102 may determine that the asset campaign database 106 is unavailable. Thus, processor 102 may retrieve the list 105 and provide it to the asset insertion decision system 111 to direct subsequent asset insertions based on the campaign data therein (i.e., based on the campaign data recorded during that recording period).

Afterwards, when the asset campaign database 106 is once again available, the asset insertion data system 101 may use the snapshot (i.e., the list 105) to synchronize the asset campaign database 106. For example, once the asset campaign database 106 is unavailable, campaign data pertaining to asset insertions may no longer be computed upon subsequent asset insertions. The asset insertion data system 101 may reconcile the asset campaign database 106 by repopulating it with the information contained in the list 105 after the database 106 becomes available for maintaining campaign data.

In one embodiment, the COD asset insertion data system 101 is operable to receive information from the headend 202 indicative of actual views of the inserted assets. For example, the headend 202 may be operable to access a CPE 207 to determine when a COD content selection is stopped such that a portion of the asset insertions are not seen by the viewer of the content selection. This information may be transferred back to the COD asset insertion data system 101 such that the campaign data of those non-viewed assets can be compensated or corrected. In other words, when assets are inserted into COD content selections and they are not viewed because of some action on the part of the viewer, such as stopping or fast forwarding the COD content selection, the campaigns of those assets should not be influenced. Accordingly, the asset insertion data system 101 may take this information into consideration to synchronize the asset campaign database 106.

The number of asset insertions and/or the recording duration thereof may be selected as a matter of design choice. Moreover, the snapshots performed by the list 105 of the asset insertion data system 101 may be performed periodically without regard to whether the asset campaign database 106 is available or not.

Figure 6:
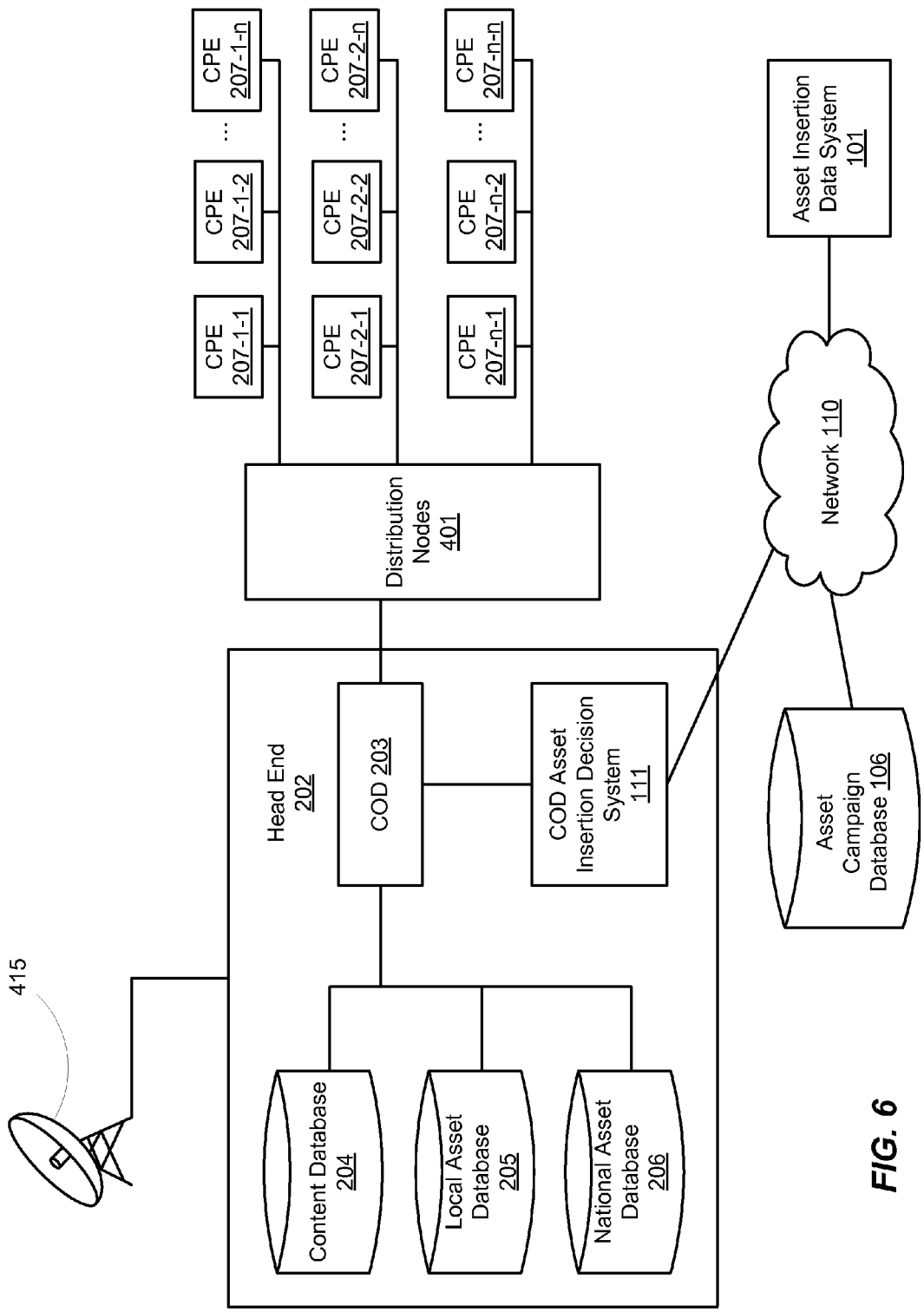
FIGS. 6-8 are block diagrams illustrating various exemplary embodiments of the asset insertion data system operable with a COD asset insertion decision system.
Figure 7:
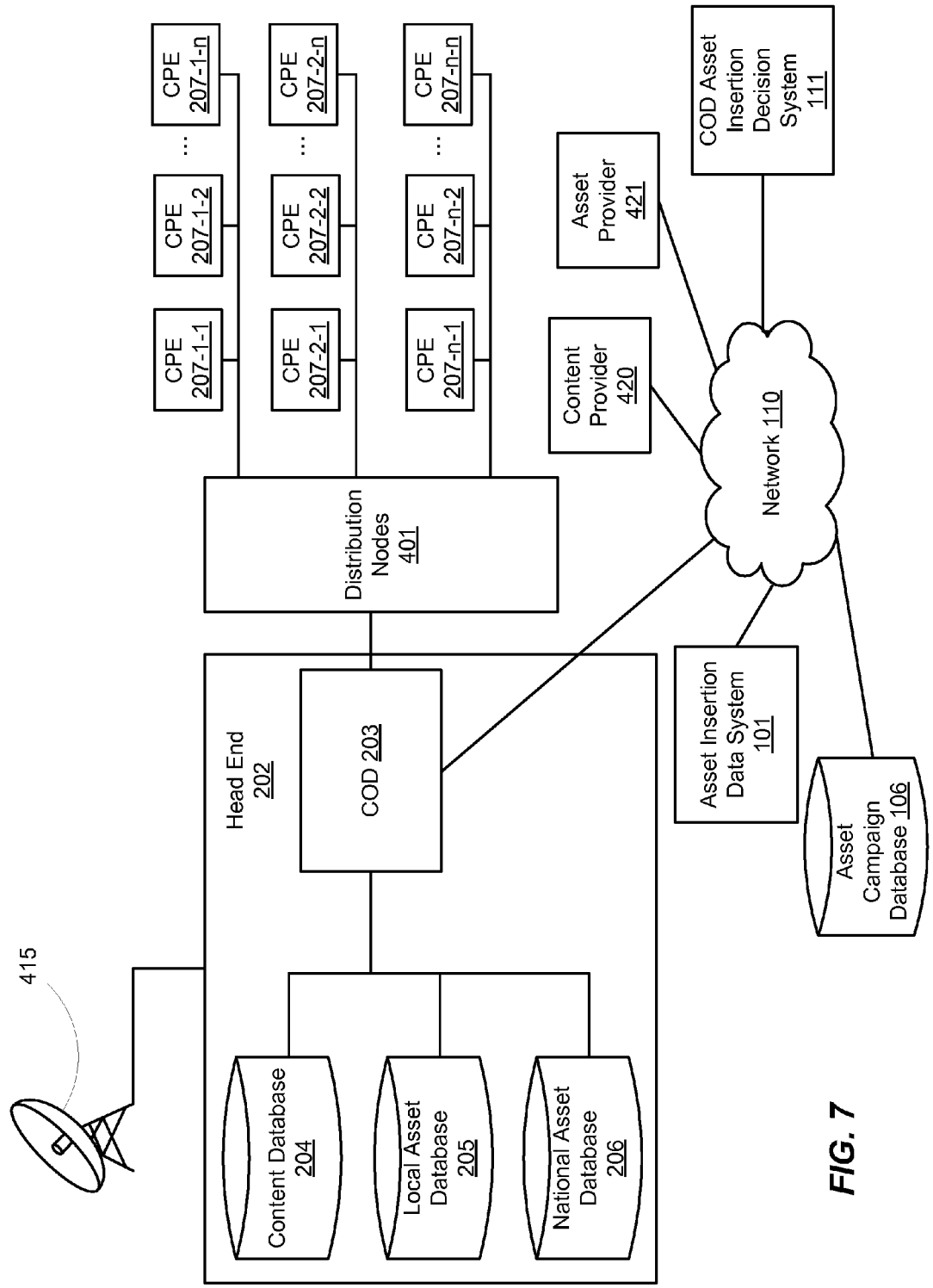
Figure 8:
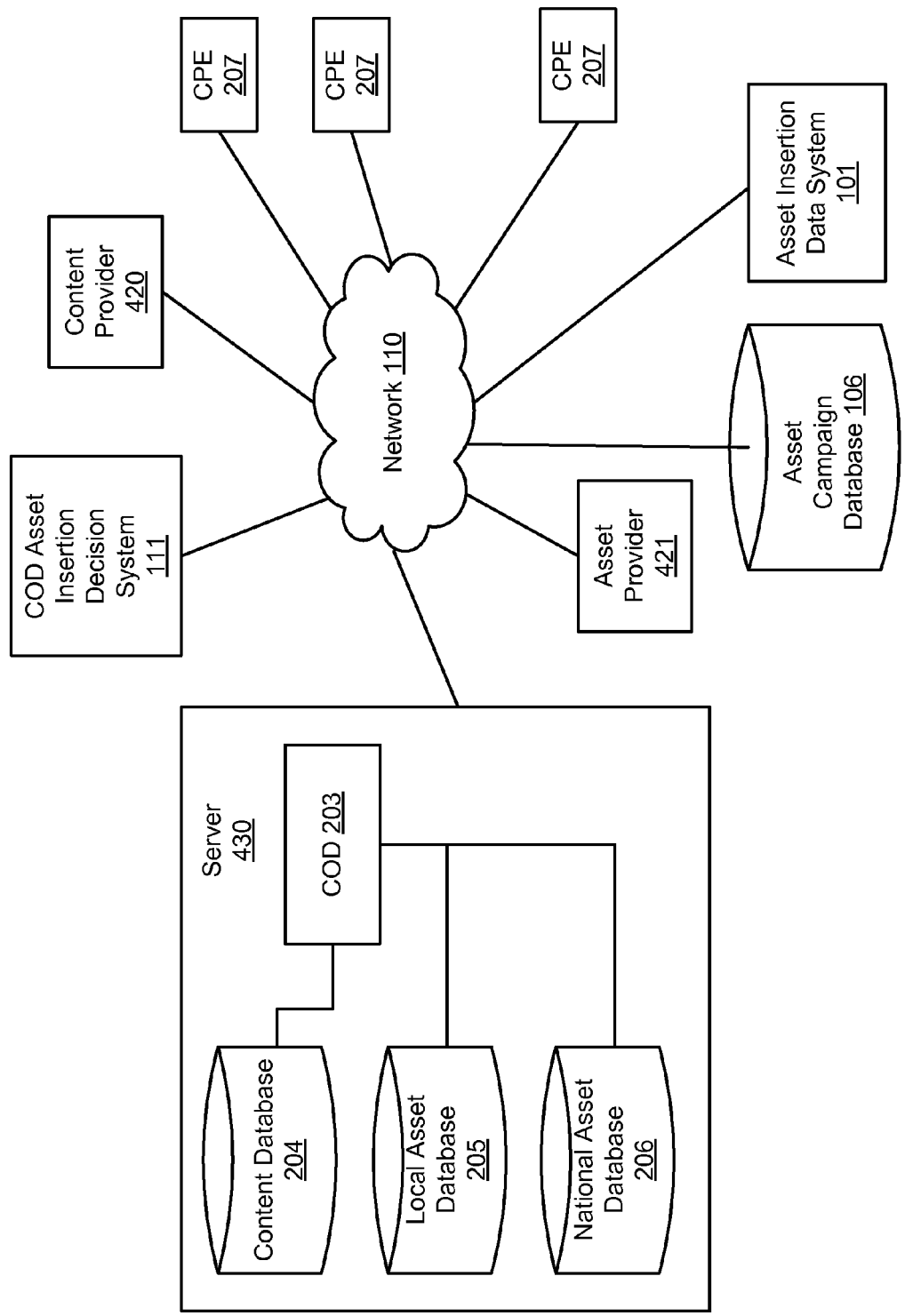

FIGS. 6-8 are block diagrams illustrating various exemplary embodiments of the asset insertion data system 101 operable with a COD asset insertion decision system 111. In FIG. 6, the COD asset insertion decision system 111 is configured within the headend 202 to retrieve assets from the local asset database 205 and/or the national asset database 206 for insertion into COD content. For example, the headend 202 may receive content from a communication link such as the satellite dish 415. The headend 202 may store that content within the content database 204 for distribution to various CPEs 207-1-1-207-*n*-*n* when so directed (where "n" is merely intended to represent an integer greater than 1 and not necessarily equal to any other "n" reference number shown and described herein). The headend 202 may be communicatively coupled to one or more distribution nodes 401 to distribute content to the CPEs 207.

Content within the content database 204 that is available to the CPEs 207 is presented to the CPEs 207 through a programming menu from the headend 202. For example, the headend 202 provides a signal to the CPEs 207 via the distribution nodes 401 containing information relating to programming, available COD content, date and time, CPE firmware instructions and updates, etc. The CPE 207 processes the signal and displays much of this information to the user via some type of display module, such as a television or a computer monitor (not shown). A user of the CPE 207 typically navigates through the information via a remote control of the CPE 207. In this regard, the user may retrieve a menu of available COD content within a content database 204 and select a desired content. The user's content selection is transferred to the COD 203 of the headend 202 via the distribution nodes 401. The COD 203 then retrieves the selected content from the content database 204 for playback to the selecting CPE 207, generally after verification that the selecting CPE 207 is indeed a valid customer of the headend 202. The COD asset insertion decision system 111 is communicatively coupled to the COD 203 to process the content selection of the CPE 207 and determine the appropriate assets to insert in the various timeslots of the selected content. The COD asset insertion decision system 111 is also communicatively coupled to the asset insertion data system 101 and to the asset campaign database 106 through the network 110 such that the asset insertion data system 101 may maintain the campaign data as described above.

A distribution node 401 is any system or device operable to interface between the headend 202 and multiple CPEs 207 for the purposes of communication. For example, the headend 202, in general, does not directly link to the CPEs 207. For a traditional cable television MSO, this generally involves a system of feeder cables and drop cables that define a number of system subsections or branches. Signals from the headend 202 may be processed by the distribution nodes 401 to insert localized content, filter locally available channels, or otherwise control the content delivered to users in the locale of a particular node. The resulting content within a node's locale is typically distributed by optical and/or coaxial links to the individual CPE 207. Each CPE 207 processes the signal from the headend 202 to display the content on the display module, such as a television, computer screen, smart phone, tablet, etc.

As shown herein, the distribution nodes 401 are aggregated into a single element for the purposes of illustration. Each distribution node 401 is coupled to a plurality of CPEs 207 to distribute the signals from the headend 202 and to process communications from the CPEs 207 to the headend 202. For example, a first distribution node 401 may be communicatively coupled to the CPEs 207-1-1-207-1-n, whereas a second distribution node 401 may be communicatively coupled to the CPEs 207-2-1-207-2-n, and so on.

In FIG. 7, the COD asset insertion decision system 111 is operable with a headend 202 through a network 110. In this embodiment, the COD asset insertion decision system 111 is separate from the headend 202 and communicates therewith via the network 110. For example, the COD asset insertion decision system 111 may be a remotely configured system that interacts with the headend 202. The asset insertion data system 101 is also communicatively coupled to the COD asset insertion decision system 111 and to the asset campaign database 106 through the network 110 to maintain the campaign data as described above.

The COD asset insertion decision system 111 may be operable to interface directly with content providers 420 and/or asset providers 421 to receive information through the network 110 regarding certain asset campaigns of the asset providers 421. For example, the content providers 420 and the asset providers 421 may negotiate to place certain assets within content from the content providers 420. The asset campaigns may be developed using certain assets from the national asset database 206 and/or the local asset database 205. Information pertaining to these negotiated asset campaigns may be conveyed to the COD asset insertion decision system 111 via the network 110. The COD asset insertion decision system 111 may then use this information and direct the COD 203 to retrieve and insert the assets of those campaigns into the COD content selected by the CPEs 207.

In FIG. 8, the COD asset insertion decision system 111 is operable with a server 430 to deliver Internet-based content through the network 110. The COD asset insertion decision system 111 is communicatively coupled to the asset insertion data system 101 and to the asset campaign database 106 through the network 110 such that the asset insertion data system 101 may maintain the campaign data as described above. The server 430 includes the COD 203 to deliver content from the content database 204 to the CPEs 207 via the Internet. Again, the COD asset insertion decision system 111 is operable to direct insertion of assets from the national asset database 206 and/or the local asset database 205 into the content for presentation to the users of the CPEs 207. The server 430 may be configured to receive content from the content provider(s) 420 and maintain that content within a content database 204. The server 430 may also receive assets from the asset provider(s) 421 and store that content within the local asset database 205 and the national asset database 206 as appropriate. The invention, however, is not intended to be limited to any particular manner in which the server 230 is intended to receive the content and/or the assets from their various providers.

In this embodiment, the CPE 207 may be a computer or a mobile computing device capable of displaying video from the network 110 (e.g., via streaming video over the Internet). For example, a CPE 207 may select a desired content from an Internet website hosted with the server 430 through the network 110. Once selected, the COD 203 may retrieve the content from the content database 204 for Internet delivery to the selecting CPE 207. The COD asset insertion decision system 111, being communicatively coupled to the COD 203, processes information pertaining to the content selection and selects assets for insertion into that content from the national asset database 206 and/or the local asset database 205. The COD asset insertion decision system 111 may do so based in part on the campaigns of the asset providers 421 and in a manner that provides value to the content providers 420.

Figure 9:
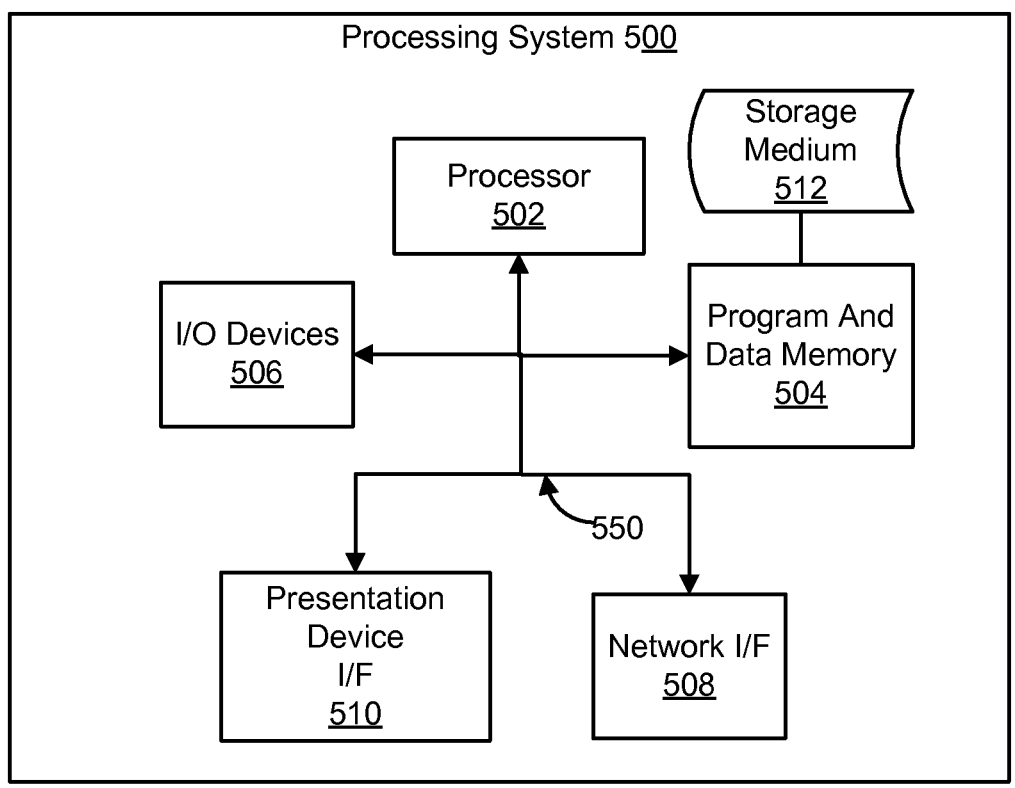
FIG. 9 is a block diagram of an exemplary processing system operable to implement an asset insertion data system.

FIG. 9 is a block diagram depicting a processing system 500 also operable to provide the above features by executing programmed instructions and accessing data stored on a computer readable storage medium 512. In this regard, embodiments of the invention can take the form of a computer program accessible via the computer-readable medium 512 providing program code for use by a computer or any other instruction execution system. For the purposes of this description, computer readable storage medium 512 can be anything that can contain, store, communicate, or transport the program for use by a computer.

The computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 500, being suitable for storing and/or executing the program code, includes at least one processor 502 coupled to memory elements 504 through a system bus 550. Memory elements 504 can include local memory employed during actual execution of the program code, bulk storage, and cache memories that provide temporary storage of at least some program code and/or data in order to reduce the number of times the code and/or data are retrieved from bulk storage during execution.

Input/output (I/O) devices 506 (including but not limited to keyboards, displays, pointing devices, etc) can be coupled to the processing system 500 either directly or through intervening I/O controllers. Network adapter interfaces 508 may also be coupled to the system to enable the processing system 500 to become coupled to other processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be coupled to the system to interface to one or more presentation devices, such as printing systems and displays for presentation of presentation data generated by the processor 502.

While the invention has been illustrated and described in detail in the drawings and foregoing description, such illustration and description is to be considered as exemplary and not restrictive in character. Certain embodiments described hereinabove may be combinable with other described embodiments and/or arranged in other ways. Accordingly, it should be understood that only the preferred embodiment and variants thereof have been shown and described and that all changes and modifications that come within the spirit of the invention are desired to be protected.

What is claimed is:

1. A network server that directs asset insertion into a plurality of Content On Demand (COD) selections by a plurality of user devices communicatively coupled to a CCD system that delivers the COD selections to the user devices, the network server is linked to the COD system and comprises:
   a database operable to maintain campaign data of a plurality of assets; and
   a COD asset insertion decision system that records a snapshot of the campaign data, and for each COD selection:
   identifies asset insertion opportunities in the COD selection, identifies assets of the campaign data for insertion into the asset insertion opportunities of the COD selection, ranks the assets, removes at least one asset from the ranked assets based on a brand separation criterion, selects at least one of the remaining ranked assets for insertion into at least one of the asset insertion opportunities of the COD selection, and directs the COD system to insert the selected at least one remaining ranked asset into the at least one asset insertion opportunity of the COD selection,
   the COD asset insertion decision system being further operable to record asset insertions in the COD selections, to update the snapshot of the campaign data based on the recorded asset insertions, and to synchronize the database with the updated snapshot to update the campaign data;
   the COD asset insertion decision system is further operable to generate instantiations of itself with a plurality of COD systems;
   each instantiation of the COD asset insertion decision system is operable to record asset insertions in the COD selections of its respective COD system; and
   the COD asset insertion decision system is further operable to update the snapshot of the campaign data based on the recorded asset insertions of each instantiation, and to synchronize the database with the updated snapshot to update the campaign data;
   wherein the COD asset insertion decision system is communicatively coupled to a plurality of COD systems; and
   the COD systems are selected from a group consisting of: Multi-System Cable operators (MSO); internet providers and telecom providers.

2. The network server of claim 1, wherein:
   the COD asset insertion decision system is further operable to establish a recording period for recording the asset insertions in the COD selections, and to synchronize the database with the updated snapshot after each recording period.

3. The network server of claim 1, wherein:
   the COD asset insertion decision system is further operable to determine an outage of the database, and to synchronize the database with the updated snapshot after the outage.

4. A method operable in a network server to direct asset insertion into a plurality of Content On Demand (COD) selections by a plurality of user devices communicatively coupled to a COD system that delivers the COD selections to the user devices, the network server is linked to the COD system and the method comprises:
   maintaining campaign data of a plurality of assets in a database;
   recording a snapshot of the campaign data via a COD asset insertion decision system of the network server, and, via the COD asset insertion decision system, for each COD selection:
   identifying asset insertion opportunities in the COD selection;
   identifying assets of the campaign data for insertion into the asset insertion opportunities of the COD selection;
   ranking the assets;
   removing at least one asset from the ranked assets based on a brand separation criterion;
   selecting at least one of the remaining ranked assets for insertion into at least one of the asset insertion opportunities of the COD selection; and
   directing the COD system to insert the selected at least one remaining ranked asset into the at least one asset insertion opportunity of the COD selection,
   the method further comprising, via the COD asset insertion decision system:
   recording asset insertions in the COD selections;
   updating the snapshot of the campaign data based on the recorded asset insertions; and
   synchronizing the database with the updated snapshot to update the campaign data;
   generating instantiations of the COD asset insertion decision system with a plurality of COD systems;
   recording asset insertions in the COD selections via each instantiation of the COD asset insertion decision system of its respective COD system; and
   via the COD asset insertion decision system;
   updating the snapshot of the campaign data based on the recorded asset insertions of each instantiation; and
   synchronizing the database with the updated snapshot to update the campaign data;
   wherein the COD asset insertion decision system is communicatively coupled to a plurality of COD systems; and
   the COD systems are selected from a group consisting of: Multi-System Cable operators (MSO); Internet providers; and telecom providers.

5. The method of claim 4, further comprising, via the COD asset insertion decision system:
    establishing a recording period for recording the asset insertions in the COD selections; and
    synchronizing the database with the updated snapshot after each recording period.

6. The method of claim 4, further comprising, via the COD asset insertion decision system:
    determining an outage of the database; and
    synchronizing the database with the updated snapshot after the outage.

7. A non-transitory computer readable medium operable in a network server and comprising instructions that, when executed by a processor of the network server, directs the processor to direct asset insertion into a plurality of Content On Demand (COD) selections by a plurality of user devices communicatively coupled to a COD system that delivers the COD selections to the user devices, the network server is to the COD system and the instructions further direct the processor to:
    maintain campaign data of a plurality of assets in a database;
    record a snapshot of the campaign data via a COD asset insertion decision system of the network server, and, via the COD asset insertion decision system, for each COD selection: identify asset insertion opportunities in the COD selection;
    identify assets of the campaign data for insertion into the asset insertion opportunities of the COD selection;
    rank the assets;
    remove at least one asset from the ranked assets based on a brand separation criterion;
    select at least one of the remaining ranked assets for insertion into at least one of the asset insertion opportunities of the COD selection; and
    direct the COD system to insert the selected at least one remaining ranked asset into the at least one asset insertion opportunity of the COD selection,
    the instructions further directing the processor to, via the COD asset insertion decision system:
    record asset insertions in the COD selections;
    update the snapshot of the campaign data based on the recorded asset insertions; and
    synchronize the database with the updated snapshot to update the campaign data;
    generate instantiations of the COD asset insertion decision system with a plurality of COD systems;
    record asset insertions in the COD selections via each instantiation of the COD asset insertion decision system of its respective COD system; and
    direct the COD asset insertion decision system to:
    update the snapshot of the campaign data based on the recorded asset insertions of each instantiation; and
    synchronize the database with the updated snapshot to update the campaign data;
    wherein the COD asset insertion decision system is communicatively coupled to a plurality of COD systems; and
    the COD systems are selected from a droop consisting of: Multi-System Cable operators (MSO); Internet providers; and telecom providers.

8. The computer readable medium of claim 7, further comprising instructions that direct the processor to, via the COD asset insertion decision system:
    establish a recording period for recording the asset insertions in the COD selections; and
    synchronize the database with the updated snapshot after each recording period.

9. The computer readable medium of claim 7, further comprising instructions that direct the processor to, via the COD asset insertion decision system:
    determine an outage of the database; and
    synchronize the database with the updated snapshot after the outage.

* * * * *